United States Patent
Tong et al.

(10) Patent No.: US 9,761,032 B2
(45) Date of Patent: *Sep. 12, 2017

(54) AVATAR FACIAL EXPRESSION ANIMATIONS WITH HEAD ROTATION

(71) Applicant: Intel Corporation, Santa Clara, CA (US)

(72) Inventors: Xiaofeng Tong, Beijing (CN); Qiang Li, Beijing (CN); Thomas Sachson, Menlo Park, CA (US); Wenlong Li, Beijing (CN)

(73) Assignee: Intel Corporation, Santa Clara, CA (US)

( * ) Notice: Subject to any disclaimer, the term of this patent is extended or adjusted under 35 U.S.C. 154(b) by 88 days.

This patent is subject to a terminal disclaimer.

(21) Appl. No.: 14/443,339

(22) PCT Filed: Jul. 25, 2014

(86) PCT No.: PCT/CN2014/082989
§ 371 (c)(1),
(2) Date: May 15, 2015

(87) PCT Pub. No.: WO2016/011654
PCT Pub. Date: Jan. 28, 2016

(65) Prior Publication Data
US 2016/0328874 A1    Nov. 10, 2016

(51) Int. Cl.
*G06T 13/40*    (2011.01)
*G06F 3/01*    (2006.01)
(Continued)

(52) U.S. Cl.
CPC ............ *G06T 13/40* (2013.01); *G06F 3/012* (2013.01); *G06K 9/00228* (2013.01);
(Continued)

(58) Field of Classification Search
CPC .. A63F 2300/6607; G06T 13/00; G06T 13/40
See application file for complete search history.

(56) References Cited

U.S. PATENT DOCUMENTS

2009/0079743 A1    3/2009  Pearson et al.
2011/0298827 A1*  12/2011  Perez ................ G06K 9/00355
                                                    345/647
(Continued)

OTHER PUBLICATIONS

International Search Report and Written Opinion mailed Apr. 28, 2015 for International Application No. PCT/CN2014/082989, 15 pages.

*Primary Examiner* — Phi Hoang
(74) *Attorney, Agent, or Firm* — Schwabe, Williamson & Wyatt, P.C.

(57) ABSTRACT

Apparatuses, methods and storage medium associated with animating and rendering an avatar are disclosed herein. In embodiments, In embodiments, an apparatus may include an avatar animation engine configured to receive a plurality of facial motion parameters and a plurality of head gestures parameters, respectively associated with a face and a head of a user. The plurality of facial motion parameters may depict facial action movements of the face, and the plurality of head gesture parameters may depict head pose gestures of the head. Further, the avatar animation engine may be configured to drive an avatar model with facial and skeleton animations to animate an avatar, using the facial motion parameters and the head gestures parameters, to replicate a facial expression of the user on the avatar that includes impact of head post rotation of the user. Other embodiments may be described and/or claimed.

19 Claims, 6 Drawing Sheets

(51) Int. Cl.
*G06K 9/00* (2006.01)
*G06T 15/04* (2011.01)
*G06T 15/50* (2011.01)

(52) U.S. Cl.
CPC .......... *G06K 9/00281* (2013.01); *G06T 15/04* (2013.01); *G06T 15/503* (2013.01); *A63F 2300/5553* (2013.01); *A63F 2300/6607* (2013.01)

(56) References Cited

U.S. PATENT DOCUMENTS

| | | |
|---|---|---|
| 2011/0304632 A1 | 12/2011 | Evertt et al. |
| 2012/0157208 A1* | 6/2012 | Reville .................. G06F 3/017 463/39 |
| 2013/0038601 A1* | 2/2013 | Han ........................ G06T 13/40 345/419 |
| 2014/0035934 A1* | 2/2014 | Du .......................... G06T 13/40 345/474 |
| 2014/0198121 A1 | 7/2014 | Tong et al. |
| 2015/0310263 A1* | 10/2015 | Zhang ................ G06K 9/00315 382/103 |
| 2015/0379335 A1* | 12/2015 | Marlow ............. G06K 9/00369 382/203 |

* cited by examiner

AVATAR FACIAL EXPRESSION ANIMATIONS WITH HEAD ROTATION

CROSS REFERENCE TO RELATED APPLICATIONS

The present application is a national phase entry under 35 U.S.C. §371 of International Application No. PCT/CN2014/082989, filed Jul. 25, 2014, entitled "AVATAR FACIAL EXPRESSION ANIMATIONS WITH HEAD ROTATION", which designated, among the various States, the United States of America. The Specification of the PCT/CN2014/082989 Application is hereby incorporated by reference.

TECHNICAL FIELD

The present disclosure relates to the field of data processing. More particularly, the present disclosure relates to animation and rendering of avatar, including facial expression animations with head rotation.

BACKGROUND

The background description provided herein is for the purpose of generally presenting the context of the disclosure. Unless otherwise indicated herein, the materials described in this section are not prior art to the claims in this application and are not admitted to be prior art by inclusion in this section.

As user's graphic representation, avatar has been quite popular in virtual world. However, most existing avatar systems are static, and few of them are driven by text, script or voice. Some other avatar systems use graphics interchange format (GIF) animation, which is a set of predefined static avatar image playing in sequence. In recent years, with the advancement of computer vision, camera, image processing, etc., some avatar may be driven by facial expressions. However, existing systems tend to be computation intensive, requiring high-performance general and graphics processor, and do not work well on mobile devices, such as smartphones or computing tablets. Further, existing systems do not take into consideration impact of head rotation, i.e., the effect of head rotation on avatar animation.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example, and not by way of limitation, in the figures of the accompanying drawings.

DETAILED DESCRIPTION

Apparatuses, methods and storage medium associated with animating and rendering an avatar are disclosed herein. In embodiments, an apparatus may include an avatar animation engine. The avatar animation engine may be configured to receive a plurality of facial motion parameters and a plurality of head gestures parameters, respectively associated with a face and a head of a user. The plurality of facial motion parameters may depict facial action movements of the face, and the plurality of head gesture parameters may depict head pose gestures of the head. Further, the avatar animation engine may be configured to drive an avatar model with facial and skeleton animations to animate an avatar, using the facial motion parameters and the head gestures parameters, to replicate a facial expression of the user on the avatar that includes impact of head post rotation of the user, e.g. when the effect on animation when the user rotates his/her to the left or right relative to his/his torso.

In embodiments, the avatar animation engine may be configured to apply head rotation impact weights from a head rotation impact weight map pre-generated employing at least a head bone and a torso bone connected at a joint. The joint may be disposed, e.g., at a neck. Further, the head rotation impact weight map may be in gray scale with lighter gray values depicting greater impact from head rotation, and having same dimensions as a 2-dimensional texture map used for animation, enabling the head rotation impact weight to be retrieved using the same pixel coordinates in the texture map.

In the following detailed description, reference is made to the accompanying drawings which form a part hereof wherein like numerals designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

Aspects of the disclosure are disclosed in the accompanying description. Alternate embodiments of the present disclosure and their equivalents may be devised without parting from the spirit or scope of the present disclosure. It should be noted that like elements disclosed below are indicated by like reference numbers in the drawings.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C).

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

As used herein, the term "module" may refer to, be part of, or include an Application Specific Integrated Circuit (ASIC), an electronic circuit, a processor (shared, dedicated, or group) and/or memory (shared, dedicated, or group) that execute one or more software or firmware programs, a combinational logic circuit, and/or other suitable components that provide the described functionality.

Figure 1:
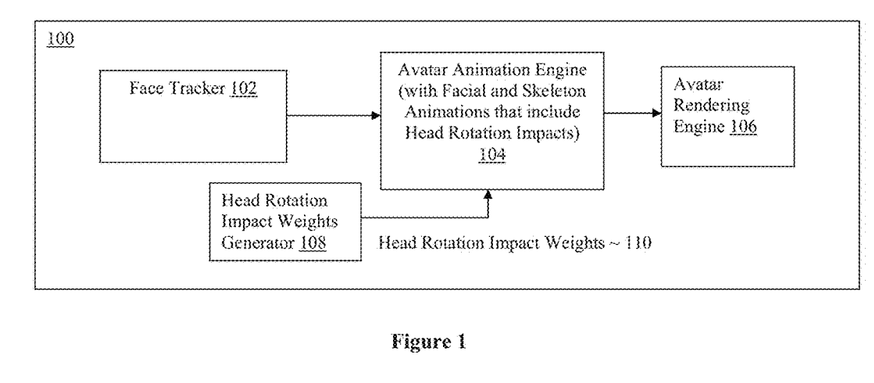
FIG. 1 illustrates a block diagram of a pocket avatar system, according to the disclosed embodiments.

Referring now to FIG. 1, wherein a pocket avatar system, according to the disclosed embodiments, is shown. As illustrated, pocket avatar system 100 may include face tracker 102, avatar animation engine 104, avatar rendering engine 106, and head rotation impact weight generator 108, coupled with each other as shown. Face tracker 102 may be configured to receive a plurality of image frames, e.g., from an image source, such as a camera (not shown), detect facial action movements of a face of a user and/or head pose gestures of a head of the user, within the plurality of image frames, and output a plurality of facial motion parameters that depict facial action movements detected, e.g., eye and/or mouth movements, and head pose gesture parameters that depict head pose gestures detected, such as head rotation, movement, and/or coming closer or farther from the camera, all in real time. Avatar animation engine 104 may be configured to receive the plurality of facial motion parameters and head pose gesture parameters outputted by face tracker 102, and drive an avatar model to animate the avatar, with facial and skeleton simulations, to replicate a facial expression of the user on the avatar that factors in head rotation impact. Head rotation impact weight generator 108 may be configured to pre-generate head rotation impact weights 110 for avatar animation engine 104. Avatar rendering engine 106 may be configured to draw the avatar as animated by avatar animation engine 104.

In embodiments, face tracker 102 may be any one of a number of face tracker known, including, but is not limited to, e.g., the facial mesh tracker disclosed in co-pending patent application, PCT Patent Application No. PCT/CN2014/073695, entitled "FACIAL EXPRESSION AND/OR INTERACTION DRIVEN AVATAR APPARATUS AND METHOD," filed Mar. 19, 2014. In general, face tracker 102 may include various function blocks to track facial expression and head pose of a user. Face tracker 102 may receive a plurality of image frames from an image capturing device, e.g., a camera, detect, through the plurality of image frames, facial action movements of the face of the user and head pose gestures of the head of the user, and output a plurality of facial motion parameters to depict facial action movements detected, and a plurality of head gesture parameters to depict head pose gestures detected, all in real time. Facial action movements and head pose gestures may be detected, e.g., through inter-frame differences for a mouth and an eye on the face, and the head, based on pixel sampling of the image frames. Face tracker 102 may include a head pose tracking function block configured to calculate rotation angles of the user's head, including pitch, yaw and/or roll, and translation distance along horizontal, vertical direction, and coming closer or going farther from the camera, eventually output as part of the head pose gesture parameters. The calculation may be based on a subset of sub-sampled pixels of the plurality of image frames, applying, e.g., dynamic template matching, re-registration, and so forth. These function blocks may be sufficiently accurate, yet scalable in their processing power required, making pocket avatar system 100 particularly suitable to be hosted by a wide range of mobile computing devices, such as smartphones and/or computing tablets.

In embodiments, avatar animation engine 104 may be configured to animate an avatar, including replication of a facial expression of the user on the avatar that factors in head rotation impact, through facial and skeleton animations and application of head rotation impact weights 110. The head rotation impact weights 110, as described earlier, may be pre-generated by head rotation impact weight generator 108 and provided to avatar animation engine 104, in e.g., the form of a head rotation impact weight map.

Additionally, avatar animation engine 104 may employ a plurality of pre-defined blend shapes during facial and skeleton animations, to speed up its operations, to contribute to making pocket avatar system 100 particularly suitable for a wide range of mobile devices.

In embodiments where shape blending is employed, a model with neutral expression and some typical expressions, such as mouth open, mouth smile, brow-up, and brow-down, blink, etc., may be first pre-constructed, prior to facial tracking and animation. The blend shapes may be decided or selected for various face tracker 102 capabilities and target mobile device system requirements. During operation, face tracker 102 may output the blend shape weights for avatar animation engine 104.

Upon receiving the blend shape weights ($\alpha_i$) for the various blend shapes, avatar animation engine 104 may generate the expressed facial results with the following formula (Eq. 1):

$$B^* = B_0 + \sum_i \alpha_i \cdot \Delta B_i$$

where B* is the target expressed facial,
$B_0$ is the base model with neutral expression, and
$\Delta B_i$ is $i^{th}$ blend shape that stores the vertex position offset based on base model for specific expression.

Compared with other facial animation techniques, such as motion transferring and mesh deformation, using blend shape for facial animation may have several advantages: 1) Expressions customization: expressions may be customized according to the concept and characteristics of the avatar, when the avatar models are created. The avatar models may be made more funny and attractive to users. 2) Low computation cost: the computation may be configured to be proportional to the model size, and made more suitable for parallel processing. 3) Good scalability: addition of more expressions into the framework may be made easier.

It will be apparent to those skilled in the art that these features, individually and in combination, make pocket avatar system 100 particularly suitable to be hosted by a wide range of mobile computing devices. However, while pocket avatar system 100 is designed to be particularly suitable to be operated on a mobile device, such as a smartphone, a phablet, a computing tablet, a laptop computer, or an e-reader, the disclosure is not to be so limited. It is anticipated that pocket avatar system 100 may also be operated on computing devices with more computing power than the typical mobile devices, such as a desktop computer, a game console, a set-top box, or a computer server. The foregoing and other aspects of pocket avatar system 100 will be described in further detail in turn below.

Figure 2:
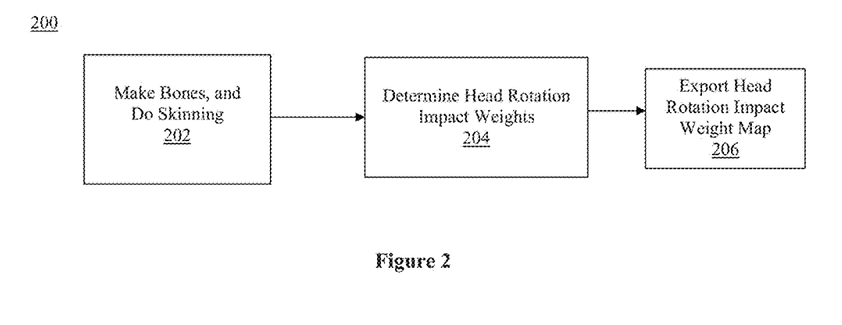
FIG. 2 illustrates an example process for generating head rotation impact weights, according to the disclosed embodiments.

FIG. 2 illustrates an example process for generating head rotation impact weights, according to the disclosed embodiments. As shown, process 200 for generating head rotation impact weights may include operations performed in blocks 202-206. The operations may be performed, e.g., by head rotation impact weight generator 108 of FIG. 1.

Figure 3:
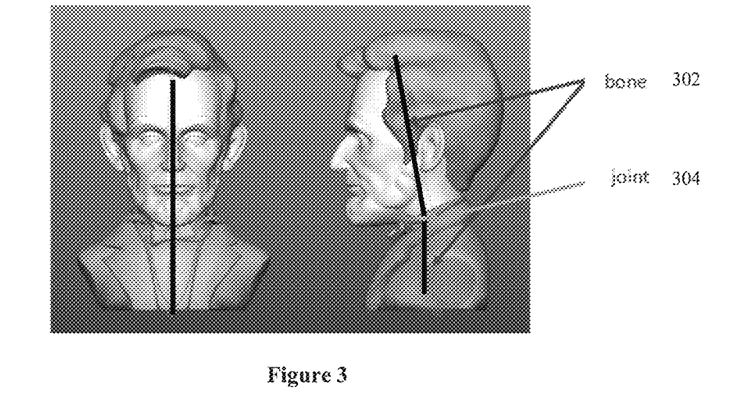
FIGS. 3 and 4 illustrate an example of bone making, and an example head rotation impact map, respectively, according to the disclosed embodiments.

Process 200 may begin at block 202. At block 202, a number of bones may be made for a model, followed by skinning of the model. Bone making and skinning may be performed with any one of a number of techniques known, e.g. using 3D computer graphics software, such as Maya, available from Autodesk Inc. of San Rafael, Calif. In embodiments, at least two bones, a head bone and a torso bone, may be made, as shown in FIG. 3 (302). The head bone and torso bone may be coupled together at a joint 304. Further, joint 304 made be disposed at a neck of the model. In alternative embodiments, more bones may be employed, and the bones may be joined together at locations other than the neck of the model.

From block 202, process 200 may proceed to block 204. At block 204, head rotation impact weights may be obtained from the bone making software. In embodiments, head rotation impact weights may be obtained for different features of the head, including but are not limited to, face, eyes, teeth, tongue, and neck. In embodiments, head rotation impact weights may also be obtained for the body (or clothing).

Figure 4:
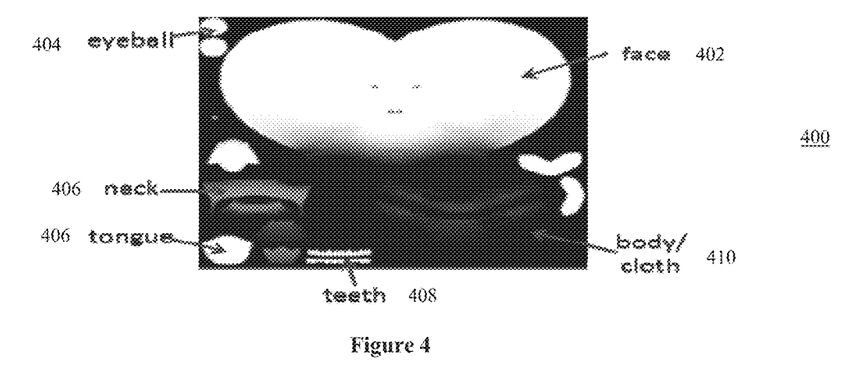

From block 204, process 200 may proceed to block 206. At block 206, the head rotation impact weights may be exported, e.g., as a map. In embodiments, the map may be a gray scale map with lighter gray scale values depicting greater impact, and darker gray scale values depicting lesser impact, as shown in FIG. 4. In embodiments, the map 400 may have the same dimensions as a two dimensional (2D) texture map (also referred to as a UV map) employed by avatar animation engine 104, thereby enabling the head rotation impact values may be retrieved for a pixel using the same UV coordinates of the pixel for the texture map. Additionally, map 400 may have corresponding sections to the texture map, e.g., a section for the face 402, a section of the eyes 404, a section for the neck 404, a section for the tongue 408, a section for the teeth 410, a section for the body/clothing 412, and so forth, making operation more efficient.

Figures 5, 6:
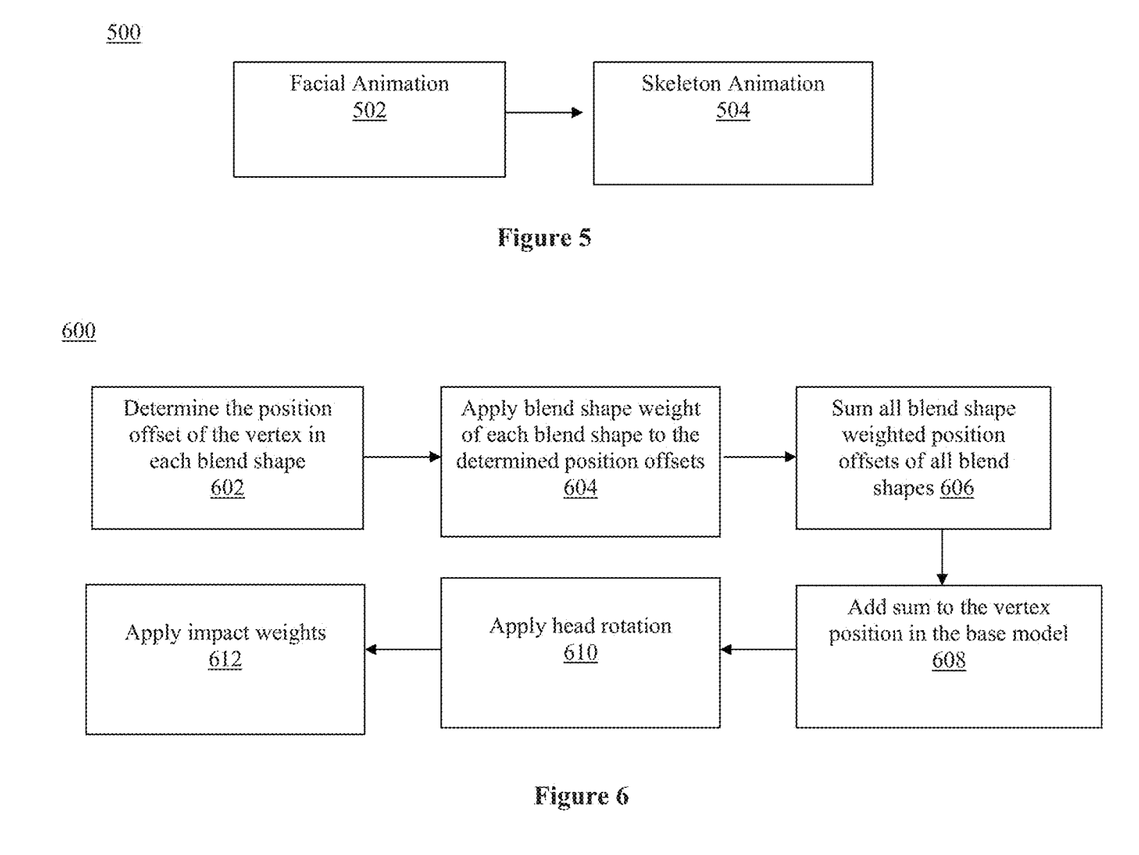
FIG. 5 is a flow diagram illustrating a process for animating avatar, according to the disclosed embodiments.
FIG. 6 is a flow diagram illustrating the process of FIG. 5 in further detail, according to the disclosed embodiments.

Referring now to FIG. 5, wherein a flow diagram illustrating a process for animating an avatar, according to the disclosed embodiments, is shown. As illustrated, process 500 for animating an avatar, including replication of facial expression on the avatar that factors in head rotation impact, may include operations performed at block 502-504. The operations may be performed by, e.g., avatar animation engine 104 of FIG. 1.

Process 500 may start at block 502. At block 502, facial expression simulations may be performed, with an avatar model being driven in accordance with a set of facial expression parameters received (e.g., from face tracker 102). In embodiments where a plurality of blend shapes are employed, the facial animation may be performed in accordance with the earlier described Eq. 1.

From block 502, process 500 may proceed to block 504. At block 504, skeleton simulation may be performed with the avatar model being further driven in accordance with a set of head pose parameters received (e.g., from face tracker 102), to modify the results of the facial simulation of block 502. In embodiments, the result of the facial simulation may be modified by the head pose values in a head pose matrix T The head pose matrix T may include values depicting yaw, pitch and/or tilt. In embodiments, the application of the head pose values may be weighted by the head rotation impact weights (w).

Referring now FIG. 6, wherein a flow diagram illustrating the process of FIG. 5 in further detail, according to the disclosed embodiments, is illustrated. Process 600 (a more detail illustration of process 500) for animating an avatar, including replication of facial expression on the avatar that factors in head rotation impact, may include operations performed in blocks 602-612. As earlier described, the operations may be performed by avatar animation engine 104 of FIG. 1. Recall, in embodiments, blend shapes may be employed and facial expression simulation is performed as represented by Eq. 1. Thus, the combined results of facial and skeleton simulations may be represented as follows (Eq. 2):

$$B_*^j = w^j \cdot T\left(B_0^j + \sum_i (\alpha_i \cdot \Delta B_i^j)\right)$$

where B* superscript j is the target expressed facial value for the $j^{th}$ pixel, $w^j$ is the head rotation impact weight for the $j^{th}$ pixel;

T is a head rotation matrix; and $B_0$, $\alpha_i$, and $\Delta B_i$ have the same meaning as earlier described in reference to Eq. 1.

Thus, for embodiments, at block 602, the position offset for a vertex pixel in each of the plurality of pre-defined blend shapes may be determined From block 602, process 600 may proceed to block 604. At block 604, corresponding blend shape weights of the various blend shapes may be applied to the position offsets determined From block 604, process 600 may proceed to block 606. At block 606, the blend shape weighted position offsets for all blend shapes may be summed From block 606, process 600 may proceed to block 608. At block 608, the sum generated in block 606 may be added to the position offset of the vertex pixel in a base model. From block 608, process 600 may proceed to block 610, then block 612. At blocks 610 and 612, the head pose values, weighted by the head rotation impact weights, may be applied to the result generated in block 608. The operations of blocks 602-612 may be repeated for all vertices of all blend shapes.

Figure 7:
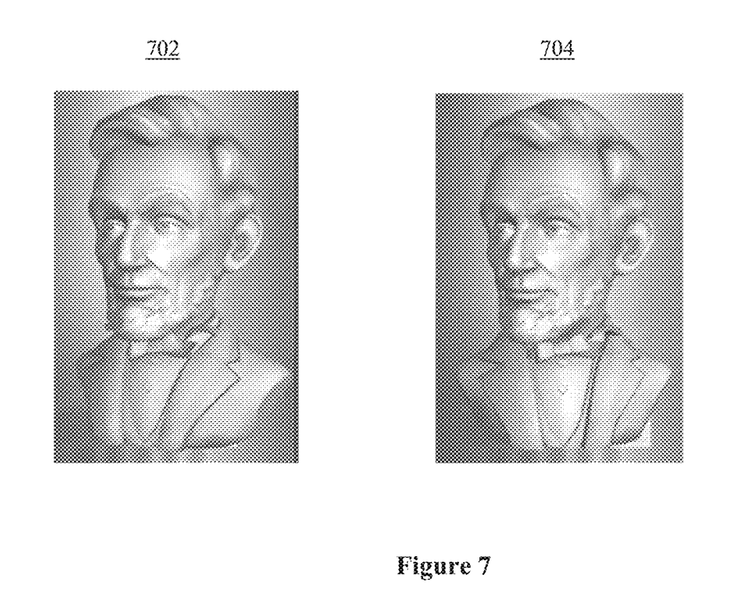
FIG. 7 illustrates an example avatar animation, with and without skeleton animation, according to the disclosed embodiments.

FIG. 7 illustrates an example avatar animation, with and without skeleton animation, according to the disclosed embodiments. As shown, image 702 illustrates a facial expression animation of an avatar without skeleton simulation that takes into consideration head rotation impact. Thus, the head of the avatar remains straightly aligned with the torso of the avatar, even when the user has tilted his/her head. Image 704 illustrates a facial expression animation of an avatar with skeleton simulation, as earlier described, taking into consideration head rotation impact. The head of the avatar tilts relatively to the torso of the avatar, corresponding to how the user tilts his/her head, providing a richer experience to the user.

Figure 8:
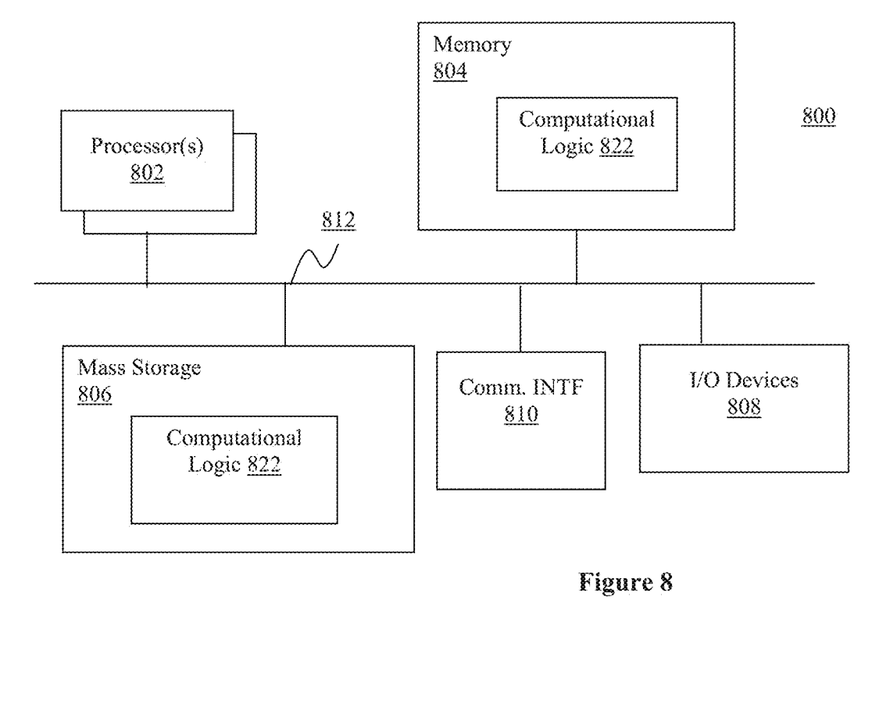
FIG. 8 illustrates an example computer system suitable for use to practice various aspects of the present disclosure, according to the disclosed embodiments.

FIG. 8 illustrates an example computer system that may be suitable for use as a client device or a server to practice selected aspects of the present disclosure. As shown, computer 800 may include one or more processors or processor cores 802, and system memory 804. For the purpose of this application, including the claims, the terms "processor" and "processor cores" may be considered synonymous, unless the context clearly requires otherwise. Additionally, computer 800 may include mass storage devices 806 (such as diskette, hard drive, compact disc read only memory (CD-ROM) and so forth), input/output devices 808 (such as display, keyboard, cursor control and so forth) and communication interfaces 810 (such as network interface cards, modems and so forth). The elements may be coupled to each other via system bus 812, which may represent one or more buses. In the case of multiple buses, they may be bridged by one or more bus bridges (not shown).

Each of these elements may perform its conventional functions known in the art. In particular, system memory 804 and mass storage devices 806 may be employed to store a working copy and a permanent copy of the programming instructions implementing the operations associated with face tracker 102, avatar animation engine 104, avatar rendering engine 106, and/or head rotation impact weight generator 108, earlier described, collectively referred to as computational logic 822. The various elements may be implemented by assembler instructions supported by processor(s) 802 or high-level languages, such as, for example, C, that can be compiled into such instructions.

The number, capability and/or capacity of these elements 810-812 may vary, depending on whether computer 800 is used as a client device or a server. When use as client device, the capability and/or capacity of these elements 810-812 may vary, depending on whether the client device is a stationary or mobile device, like a smartphone, computing tablet, ultrabook or laptop. Otherwise, the constitutions of elements 810-812 are known, and accordingly will not be further described.

Figure 9:
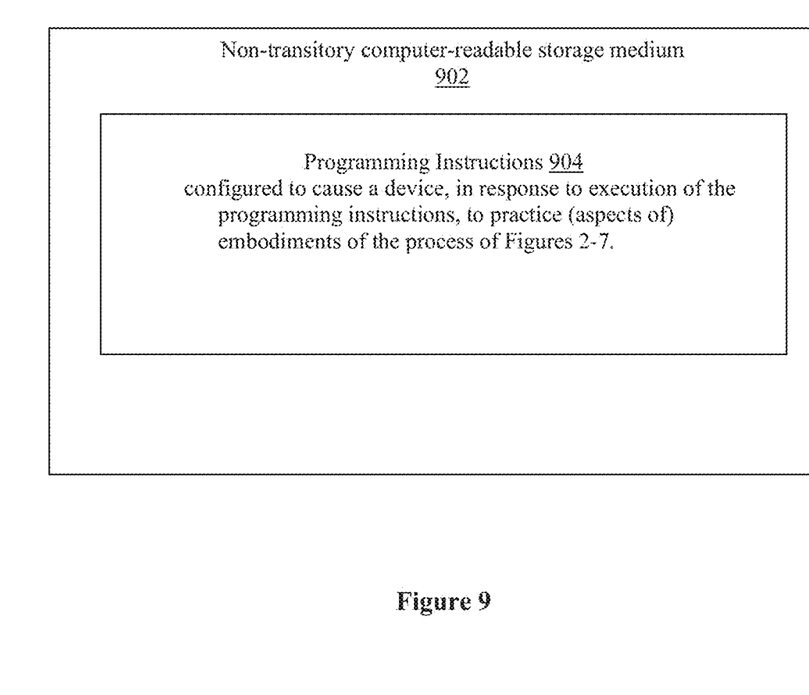
FIG. 9 illustrates a storage medium having instructions for practicing methods described with references to FIGS. 2-7, according to disclosed embodiments.

As will be appreciated by one skilled in the art, the present disclosure may be embodied as methods or computer program products. Accordingly, the present disclosure, in addition to being embodied in hardware as earlier described, may take the form of an entirely software embodiment (including firmware, resident software, micro-code, etc.) or an embodiment combining software and hardware aspects that may all generally be referred to as a "circuit," "module" or "system." Furthermore, the present disclosure may take the form of a computer program product embodied in any tangible or non-transitory medium of expression having computer-usable program code embodied in the medium. FIG. 9 illustrates an example computer-readable non-transitory storage medium that may be suitable for use to store instructions that cause an apparatus, in response to execution of the instructions by the apparatus, to practice selected aspects of the present disclosure. As shown, non-transitory computer-readable storage medium 902 may include a number of programming instructions 904. Programming instructions 904 may be configured to enable a device, e.g., computer 800, in response to execution of the programming instructions, to perform, e.g., various operations associated with face tracker 102, avatar animation engine 104, avatar rendering engine 106, and/or head rotation impact weight generator 108. In alternate embodiments, programming instructions 904 may be disposed on multiple computer-readable non-transitory storage media 902 instead. In alternate embodiments, programming instructions 904 may be disposed on computer-readable transitory storage media 902, such as, signals.

Any combination of one or more computer usable or computer readable media may be utilized. The computer-usable or computer-readable medium/media may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium/media could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present disclosure is described with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a," "an" and "the" are intended to include plural forms as well, unless the context clearly indicates otherwise. It will be further understood that the terms "comprises" and/or "comprising," when used in this specification, specific the presence of stated features, integers, steps, operations, elements, and/or components, but do not preclude the presence or addition of one or more other features, integers, steps, operation, elements, components, and/or groups thereof.

Embodiments may be implemented as a computer process, a computing system or as an article of manufacture such as a computer program product of computer readable media. The computer program product may be a computer storage medium readable by a computer system and encoding a computer program instructions for executing a computer process.

The corresponding structures, material, acts, and equivalents of all means or steps plus function elements in the claims below are intended to include any structure, material or act for performing the function in combination with other claimed elements are specifically claimed. The description of the present disclosure has been presented for purposes of illustration and description, but is not intended to be exhaustive or limited to the disclosure in the form disclosed. Many modifications and variations will be apparent to those of ordinary skill without departing from the scope and spirit of the disclosure. The embodiment was chosen and described in order to best explain the principles of the disclosure and the practical application, and to enable others of ordinary skill in the art to understand the disclosure for embodiments with various modifications as are suited to the particular use contemplated.

Referring back to FIG. 8, for one embodiment, at least one of processors 802 may be packaged together with memory having computational logic 822 (in lieu of storing on memory 804 and storage 806). For one embodiment, at least one of processors 802 may be packaged together with memory having computational logic 822 to form a System in Package (SiP). For one embodiment, at least one of processors 802 may be integrated on the same die with memory having computational logic 822. For one embodiment, at least one of processors 802 may be packaged together with memory having computational logic 822 to form a System on Chip (SoC). For at least one embodiment, the SoC may be utilized in, e.g., but not limited to, a smartphone or computing tablet.

Thus various example embodiments of the present disclosure have been described including, but are not limited to:

Example 1 may be an apparatus for rendering an avatar. The apparatus may comprise one or more processors, and an avatar animation engine. The avatar animation engine may be operated by the one or more processors, to receive a plurality of facial motion parameters and a plurality of head gestures parameters, respectively associated with a face and a head of a user, and drive an avatar model with facial and skeleton animations to animate the avatar, using the facial motion parameters and the head gestures parameters, to replicate a facial expression of the user on the avatar, that includes impact of head post rotation of the user. The plurality of facial motion parameters may depict facial action movements of the face, and the plurality of head gesture parameters may depict head pose gestures of the head.

Example 2 may be example 1, wherein the avatar animation engine is to apply head rotation impact weights when driving the avatar model with facial and skeleton animations.

Example 3 may be example 2, wherein the avatar animation engine is to apply head rotation impact weights from a head rotation impact weight map pre-generated employing at least a head bone and a torso bone connected at a joint.

Example 4 may be example 3, wherein the joint is disposed at a neck.

Example 5 may be example 3 or 4, wherein the head rotation impact weight map is in gray scale with lighter gray values depict greater impact from head rotation.

Example 6 may be any one of examples 3-5, wherein the head rotation impact weight map has a layout that includes a section for the face, a section for eyeballs of the face, a section for a neck of the user, a section for a tongue of the face, a section for teeth of the face or a section for a body or clothing of the user.

Example 7 may be any one of examples 3-6, wherein the avatar animation engine is to further employ a 2-dimensional texture map, and the head rotation impact weight map has layout or dimensions that correspond to the 2-dimensional texture map; and wherein the animation engine is to retrieve an impact weight for a vertex from the head rotation impact weight map, using corresponding coordinates of the vertex in the 2-dimensional texture map.

Example 8 may be any one of examples 2-7, wherein the avatar animation engine is to blend a plurality of pre-defined blend shapes when driving the avatar model with facial animation, and apply the head rotation impact weights to the result of the facial animation to drive the avatar model with skeleton simulation.

Example 9 may be example 8, wherein to blend a plurality of pre-defined blend shapes when driving the avatar model with facial animation, comprises: determine a position offset in each of the plurality of pre-defined blend shapes; apply corresponding blend shape weights to the position offsets determined; sum the blend shape weighted position offsets for all blend shapes; and add the sum to a position offset of the vertex in a base model.

Example 10 may be any one of examples 2-9, wherein head rotation comprises yaw, pitch or tilt.

Example 11 may be any one of examples 1-10 further comprising a facial mesh tracker, operated by the one or more processors, to receive a plurality of image frames, detect, through the plurality of image frames, facial action movements of the face of the user and head pose gestures of the head of the user, and output the plurality of facial motion parameters to depict facial action movements detected, and the plurality of head gesture parameters to depict head pose gestures detected, all in real time. Detection of facial action movements and head pose gestures may include detection of inter-frame differences for a mouth and an eye on the face, and the head, based on pixel sampling of the image frames.

Example 12 may be example 11, wherein the plurality of image frames are captured by a camera, and the head pose gestures include head rotation, movement along horizontal and vertical directions, and the head comes closer or goes farther from the camera; and wherein the plurality of head pose gesture parameters include head pose gesture parameters that depict head rotation, head movement along horizontal and vertical directions, and head comes closer or goes farther from the camera.

Example 13 may be example 11 or 12, wherein the facial mesh tracker includes a head pose tracking function block to calculate rotation angles of the user's head, based on a subset of sub-sampled pixels of the plurality of image frames, and apply dynamic template matching and re-registration.

Example 14 may be any one of examples 11-13 further comprising an avatar rendering engine coupled with the avatar animation engine and operated by the one or more processors to draw the avatar as animated by the avatar animation engine.

Example 15 may be a method for rendering an avatar. The method may comprise receiving, by a computing device, a plurality of facial motion parameters and a plurality of head gestures parameters, respectively associated with a face and a head of a user; and driving an avatar model with facial and skeleton animations to animate the avatar, using the facial motion parameters and the head gestures parameters, to replicate a facial expression of the user on the avatar, that includes impact of head post rotation of the user. The plurality of facial motion parameters may depict facial action movements of the face, and the plurality of head gesture parameters may depict head pose gestures of the head.

Example 16 may be example 15, wherein driving comprises applying head rotation impact weights while driving the avatar model with facial and skeleton animations.

Example 17 may be example 16, wherein applying comprises applying head rotation impact weights from a head rotation impact weight map pre-generated employing at least a head bone and a torso bone connected at a joint.

Example 18 may be example 17, wherein the joint is disposed at a neck.

Example 19 may be example 17 or 18, wherein the head rotation impact weight map is in gray scale with lighter gray values depict greater impact from head rotation.

Example 20 may be any one of examples 17-19, wherein the head rotation impact weight map has a layout that includes a section for the face, a section for eyeballs of the face, a section for a neck of the user, a section for a tongue of the face, a section for teeth of the face or a section for a body or clothing of the user.

Example 21 may be any one of examples 17-20, wherein driving comprises employing a 2-dimensional texture map; wherein the head rotation impact weight map has layout or dimensions that correspond to the 2-dimensional texture map; wherein applying comprises retrieving an impact weight for a vertex from the head rotation impact weight map, using corresponding coordinates of the vertex in the 2-dimensional texture map.

Example 22 may be any one of examples 16-21, wherein driving comprises blending a plurality of pre-defined blend shapes while driving the avatar model with facial animation, and applying the head rotation impact weights to the result of the facial animation to drive the avatar model with skeleton simulation.

Example 23 may be example 22, wherein blending a plurality of pre-defined blend shapes while driving the avatar model with facial animation, comprises: determining a position offset in each of the plurality of pre-defined blend shapes; applying corresponding blend shape weights to the position offsets determined; summing the blend shape weighted position offsets for all blend shapes; and adding the sum to a position offset of the vertex in a base model.

Example 24 may be example 22, wherein head rotation comprises yaw, pitch or tilt.

Example 25 may be a computer-readable medium comprising instructions to cause an computing device, in response to execution of the instructions, to: receive a plurality of facial motion parameters and a plurality of head gestures parameters, respectively associated with a face and a head of a user; and drive an avatar model with facial and skeleton animations to animate the avatar, using the facial motion parameters and the head gestures parameters, to replicate a facial expression of the user on the avatar, that includes impact of head post rotation of the user. The plurality of facial motion parameters may depict facial action movements of the face, and the plurality of head gesture parameters may depict head pose gestures of the head.

Example 26 may be example 25, wherein to drive comprises application of head rotation impact weights while driving the avatar model with facial and skeleton animations.

Example 27 may be example 26, wherein to application comprises application of head rotation impact weights from a head rotation impact weight map pre-generated employing at least a head bone and a torso bone connected at a joint.

Example 28 may be example 27, wherein the joint is disposed at a neck.

Example 29 may be example 27 or 28, wherein the head rotation impact weight map is in gray scale with lighter gray values depict greater impact from head rotation.

Example 30 may be any one of examples 27-29, wherein the head rotation impact weight map has a layout that includes a section for the face, a section for eyeballs of the face, a section for a neck of the user, a section for a tongue of the face, a section for teeth of the face or a section for a body or clothing of the user.

Example 31 may be any one of examples 27-30, wherein to drive comprises employment of a 2-dimensional texture map; wherein the head rotation impact weight map has layout or dimensions that correspond to the 2-dimensional texture map; wherein application comprises retrieval of an impact weight for a vertex from the head rotation impact weight map, using corresponding coordinates of the vertex in the 2-dimensional texture map.

Example 32 may be any one of examples 26-31, wherein to drive comprises to blend a plurality of pre-defined blend shapes while driving the avatar model with facial animation, and to apply the head rotation impact weights to the result of the facial animation to drive the avatar model with skeleton simulation.

Example 33 may be example 32, wherein to blend a plurality of pre-defined blend shapes while driving the avatar model with facial animation, comprises: determine a position offset in each of the plurality of pre-defined blend shapes; apply corresponding blend shape weights to the position offsets determined; sum the blend shape weighted position offsets for all blend shapes; and add the sum to a position offset of the vertex in a base model.

Example 34 may be example 32, wherein head rotation comprises yaw, pitch or tilt.

Example 35 may be an apparatus for rendering an avatar. The apparatus may include means for receiving a plurality of facial motion parameters and a plurality of head gestures parameters, respectively associated with a face and a head of a user; and means for driving an avatar model with facial and skeleton animations to animate the avatar, using the facial motion parameters and the head gestures parameters, to replicate a facial expression of the user on the avatar, that includes impact of head post rotation of the user. The plurality of facial motion parameters may depict facial action movements of the face, and the plurality of head gesture parameters may depict head pose gestures of the head.

Example 36 may be example 35, wherein means for driving comprises means for applying head rotation impact weights while driving the avatar model with facial and skeleton animations.

Example 37 may be example 36, wherein means for applying comprises means for applying head rotation impact weights from a head rotation impact weight map pre-generated employing at least a head bone and a torso bone connected at a joint.

Example 38 may be example 37, wherein the joint is disposed at a neck.

Example 39 may be example 37 or 38, wherein the head rotation impact weight map is in gray scale with lighter gray values depict greater impact from head rotation.

Example 40 may be any one of examples 37-39, wherein the head rotation impact weight map has a layout that includes a section for the face, a section for eyeballs of the face, a section for a neck of the user, a section for a tongue of the face, a section for teeth of the face or a section for a body or clothing of the user.

Example 41 may be any one of examples 37-39, wherein means for driving comprises means for employing a 2-dimensional texture map; wherein the head rotation impact weight map has layout or dimensions that correspond to the 2-dimensional texture map; wherein applying comprises retrieving an impact weight for a vertex from the head rotation impact weight map, using corresponding coordinates of the vertex in the 2-dimensional texture map.

Example 42 may be any one of examples 36-41, wherein means for driving comprises means for blending a plurality of pre-defined blend shapes while driving the avatar model with facial animation, and applying the head rotation impact weights to the result of the facial animation to drive the avatar model with skeleton simulation.

Example 43 may be example 42, wherein means for blending a plurality of pre-defined blend shapes while driving the avatar model with facial animation, comprises: means for determining a position offset in each of the plurality of pre-defined blend shapes; means for applying corresponding blend shape weights to the position offsets determined; means for summing the blend shape weighted position offsets for all blend shapes; and means for adding the sum to a position offset of the vertex in a base model.

Example 44 may be example 42, wherein head rotation comprises yaw, pitch or tilt.

It will be apparent to those skilled in the art that various modifications and variations can be made in the disclosed embodiments of the disclosed device and associated methods without departing from the spirit or scope of the disclosure. Thus, it is intended that the present disclosure covers the modifications and variations of the embodiments disclosed above provided that the modifications and variations come within the scope of any claim and its equivalents.

What is claimed is:

1. An apparatus for rendering an avatar, comprising:
   one or more processors; and
   an avatar animation engine, to be operated by the one or more processors, to receive a plurality of facial motion parameters and a plurality of head gestures parameters, respectively associated with a face and a head of a user, and drive an avatar model with facial and skeleton animations to animate an avatar, employing at least a head bone and a torso bone connected at a joint and using the facial motion parameters and the head gestures parameters, to replicate a facial expression of the user on the avatar, that includes impact of head post rotation of the user;
   wherein the plurality of facial motion parameters depict facial action movements of the face, and the plurality of head gestures parameters depict head pose gestures of the head;
   wherein the avatar animation engine is to apply head rotation impact weights when driving the avatar model with facial and skeleton animations; and
   wherein the avatar animation engine is to apply head rotation impact weights from a head rotation impact weight map pre-generated employing the at least a head bone and a torso bone connected at a joint.

2. The apparatus of claim 1, wherein the joint is disposed at a neck.

3. The apparatus of claim 1, wherein the head rotation impact weight map is in gray scale with lighter gray values depicting greater impact from head rotation.

4. The apparatus of claim 1, wherein the head rotation impact weight map has a layout that includes a section for the face, a section for eyeballs of the face, a section for a neck of the user, a section for a tongue of the face, a section for teeth of the face or a section for a body or clothing of the user.

5. The apparatus of claim 1, wherein the avatar animation engine is to further employ a 2-dimensional texture map, and the head rotation impact weight map has layout or dimensions that correspond to the 2-dimensional texture map; and wherein the animation engine is to retrieve an impact weight for a vertex from the head rotation impact weight map, using corresponding coordinates of the vertex in the 2-dimensional texture map.

6. The apparatus of claim 1, wherein the avatar animation engine is to blend a plurality of pre-defined blend shapes when driving the avatar model with facial animation, and apply the head rotation impact weights to a result of the facial animation to drive the avatar model with skeleton simulation.

7. The apparatus of claim 6, wherein to blend a plurality of pre-defined blend shapes when driving the avatar model with facial animation comprises:
 determine a position offset in each of the plurality of pre-defined blend shapes;
 apply corresponding blend shape weights to the position offsets determined;
 sum the blend shape weighted position offsets for all blend shapes; and
 add the sum to a position offset of a vertex in a base model.

8. The apparatus of claim 1, wherein head rotation comprises yaw, pitch or tilt.

9. The apparatus of claim 1 further comprising a facial mesh tracker, operated by the one or more processors, to receive a plurality of image frames, detect, through the plurality of image frames, facial action movements of the face of the user and head pose gestures of the head of the user, and output the plurality of facial motion parameters to depict facial action movements detected, and the plurality of head gestures parameters to depict head pose gestures detected, all in real time;
 wherein detection of facial action movements and head pose gestures includes detection of inter-frame differences for a mouth and an eye on the face, and the head, based on pixel sampling of the image frames.

10. The apparatus of claim 9 further comprising an avatar rendering engine coupled with the avatar animation engine and operated by the one or more processors to draw the avatar as animated by the avatar animation engine.

11. A method for rendering an avatar, comprising:
 receiving, by a computing device, a plurality of facial motion parameters and a plurality of head gestures parameters, respectively associated with a face and a head of a user; and
 driving an avatar model with facial and skeleton animations to animate the avatar, employing at least a head bone and a torso bone connected at a joint and using the facial motion parameters and the head gestures parameters to replicate a facial expression of the user on the avatar, that includes impact of head post rotation of the user;
 wherein the plurality of facial motion parameters depict facial action movements of the face, and the plurality of head gestures parameters depict head pose gestures of the head;
 wherein driving comprises applying head rotation impact weights while driving the avatar model with facial and skeleton animations; and
 wherein applying comprises applying head rotation impact weights from a head rotation impact weight may pre-generated employing the at least a head bone and a torso bone connected at a joint.

12. A non-transitory computer-readable medium comprising instructions to cause a computing device, in response to execution of the instructions, to:
 receive a plurality of facial motion parameters and a plurality of head gestures parameters, respectively associated with a face and a head of a user; and
 drive an avatar model with facial and skeleton animations to animate the avatar, employing at least a head bone and a torso bone connected at a joint and using the facial motion parameters and the head gestures parameters to replicate a facial expression of the user on the avatar, that includes impact of head post rotation of the user;
 wherein the plurality of facial motion parameters depict facial action movements of the face, and the plurality of head gestures parameters depict head pose gestures of the head;
 wherein to drive comprises application of head rotation impact weights while driving the avatar model with facial and skeleton animations; and
 wherein application comprises application of head rotation impact weights from a head rotation impact weight map pre-generated employing the at least a head bone and a torso bone connected at a joint.

13. The computer-readable medium of claim 12, wherein the joint is disposed at a neck.

14. The computer-readable medium of claim 12, wherein the head rotation impact weight map is in gray scale with lighter gray values depicting greater impact from head rotation.

15. The computer-readable medium of claim 12, wherein the head rotation impact weight map has a layout that includes a section for the face, a section for eyeballs of the face, a section for a neck of the user, a section for a tongue of the face, a section for teeth of the face or a section for a body or clothing of the user.

16. The computer-readable medium of claim 12, wherein to drive comprises employment of a 2-dimensional texture map; wherein the head rotation impact weight map has a layout or dimensions that correspond to the 2-dimensional texture map; wherein application comprises retrieval of an impact weight for a vertex from the head rotation impact weight map, using corresponding coordinates of the vertex in the 2-dimensional texture map.

17. The computer-readable medium of claim 12, wherein to drive comprises to blend a plurality of pre-defined blend shapes while driving the avatar model with facial animation, and to apply the head rotation impact weights to a result of the facial animation to drive the avatar model with skeleton simulation.

18. The computer-readable medium of claim 17, wherein to blend a plurality of pre-defined blend shapes while driving the avatar model with facial animation comprises:
 determine a position offset in each of the plurality of pre-defined blend shapes;
 apply corresponding blend shape weights to the position offsets determined;
 sum the blend shape weighted position offsets for all blend shapes; and
 add the sum to a position offset of a vertex in a base model.

19. The computer-readable medium of claim 12, wherein head rotation comprises yaw, pitch or tilt.

* * * * *

UNITED STATES PATENT AND TRADEMARK OFFICE
CERTIFICATE OF CORRECTION

PATENT NO. : 9,761,032 B2
APPLICATION NO. : 14/443339
DATED : September 12, 2017
INVENTOR(S) : Xiaofeng Tong et al.

It is certified that error appears in the above-identified patent and that said Letters Patent is hereby corrected as shown below:

In the Claims

Column 15
Line 51, "…weight may…" should read - …weight map… -

Signed and Sealed this
Nineteenth Day of December, 2017

Joseph Matal
*Performing the Functions and Duties of the*
*Under Secretary of Commerce for Intellectual Property and*
*Director of the United States Patent and Trademark Office*